United States Patent

[11] 3,609,719

[72] Inventor James M. Lommel Schenectady, N.Y.
[21] Appl. No. 885,697
[22] Filed Dec. 17, 1969
[45] Patented Sept. 28, 1971
[73] Assignee General Electric Company

[54] FIRST ORDER TRANSITION RECORDING UTILIZING INCOMPLETE TRANSITION IRON-RHODIUM FILMS
11 Claims, 4 Drawing Figs.

[52] U.S. Cl. .......... 340/174 TF, 117/235, 148/31.55, 340/174 MS, 340/174 YC, 346/74 MT
[51] Int. Cl. .......... G11c 11/14, G11c 11/42, H01v 3/04
[50] Field of Search .......... 340/174 TF, 174 R, 174 YC; 346/74 MT; 148/31.55; 117/235

[56] References Cited

UNITED STATES PATENTS 3,521,294 7/1970 Treves .......... 346/74

*Primary Examiner*—James W. Moffitt
*Attorneys*—Richard R. Brainard, Paul A. Frank, Charles T. Watts, John J. Kissane, Frank L. Neuhauser, Oscar B. Waddell and Joseph B. Forman

ABSTRACT: Information is thermally recorded along an iron-rhodium film exhibiting a thermal transition between the ferromagnetic and antiferromagnetic states of substantially less than 50 percent by applying strain to the film in excess of 0.3 percent to increase the percentage of film undergoing transition to the antiferromagnetic state by an amount greater than approximately 40 percent of the original transition. Selective sites of the highly antiferromagnetic film then are heated, e.g. utilizing an addressable electron beam gun, to produce a first order transition of the heated sites to the ferromagnetic state for storage of information at the site and after applying a uniform magnetic field to the film, the magnetization of each bit site is read out utilizing conventional electron mirror microscopy or secondary electron emission techniques.

Figure 1:
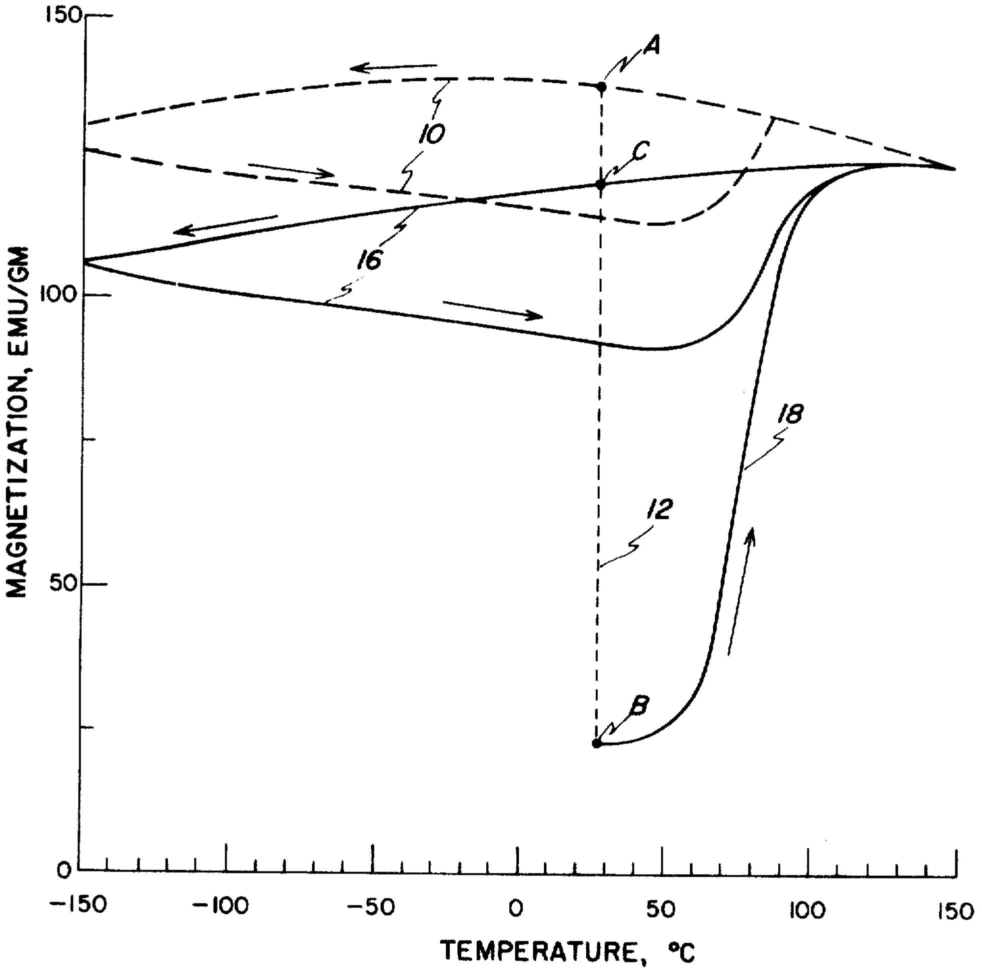

INVENTOR:
JAMES M. LOMMEL
by John J. Kissane
HIS ATTORNEY

INVENTOR:
JAMES M. LOMMEL
by John J Kessens [signature]
HIS ATTORNEY

INVENTOR:
JAMES M. LOMMEL
by John J. Kissane
HIS ATTORNEY

FIRST ORDER TRANSITION RECORDING UTILIZING INCOMPLETE TRANSITION IRON-RHODIUM FILMS

This application relates to a method and apparatus for magnetically recording information upon an iron-rhodium film exhibiting less than a 50 percent transition between the ferromagnetic and antiferromagnetic states upon temperature cycling. In a more particular aspect of this invention, previously written information is erased from the incomplete transition iron-rhodium film by application of a strain to the film to increase the percentage of film in the antiferromagnetic state prior to thermal recording at selective sites along the film. The invention described herein was made in the course of or under a contract with the Department of the Air Force.

The intermetallic compound iron-rhodium has been a source of scientific curiosity because of the first order transition displayed by the bulk metal in abruptly transforming from the antiferromagnetic to the ferromagnetic state upon heating to a temperature above 60° C. Although thin films of iron-rhodium produced by conventional film forming techniques characteristically exhibit only a partial transition to the antiferromagnetic state upon cooling, i.e. generally less than 50 percent of the film is thermally transformable to the antiferromagnetic state, in my copending application Ser. No. 776,619, filed Nov. 18, 1968 and assigned to the assignee of the present invention, there is disclosed and claimed a method for producing complete transition iron-rhodium films by annealing the incomplete transition films in an inert atmosphere containing oxygen in quantities greater than 10 parts per million. Because of the substantial magnetic transition associated with the oxygen annealed iron-rhodium films, the films suitably are utilized as a memory plane for First Order Transition Recording wherein digital information is stored by heating selective sites of a previously cooled film to a temperature in excess of 60° thereby transforming the heated sites from the antiferromagnetic to the ferromagnetic state in a first order transition.

I have discovered that First Order Transition Recording can be practiced successfully utilizing iron-rhodium films exhibiting an incomplete thermal transition from the ferromagnetic to the antiferromagnetic state by applying strain to the film to substantially increase the percentage of film undergoing transition to the antiferromagnetic state. Although strain also is disclosed in my heretofore cited patent application for erasing recorded information by the transformation of a substantially complete transition film to the antiferromagnetic state, the transition obtained by the application of strain in my previously filed application was not in excess of the thermal transition obtainable in the film.

It is therefore an object of this invention to provide a method of First Order Transition Recording utilizing iron-rhodium films exhibiting an incomplete thermal transition to the antiferromagnetic state.

It is also an object of this invention to provide a method of the First Order Transition Recording wherein the percentage of iron-rhodium film transformed to the antiferromagnetic state exceeds the percentage of film thermally transformable to the antiferromagnetic state.

It is a further object of this invention to provide a recording medium wherein mechanical strain forces are employed to substantially increase the percentage of the film undergoing transformation to the antiferromagnetic state.

To record information in binary digital form in accordance with this invention, an iron-rhodium film having a composition range between 50 and 65 percent rhodium and exhibiting an incomplete thermal transition of less than 50 percent of the film is mechanically strained by a force to a strain in excess of 0.3 percent to increase the percentage of film undergoing transition to the antiferromagnetic state. Selective sites of the film then are heated above the transition temperature of the film to return the site to the ferromagnetic state in a first order transition and readout is effected by detecting the magnetization of the various sites along the film. Thus, a recording medium in accordance with this invention comprises a thin iron-rhodium film having a composition range between 50 and 65 atom percent rhodium and exhibiting an incomplete thermal transition of less than 50 percent of the film overlying a nonmagnetic substrate capable of withstanding a mechanical strain in excess of 0.3 percent. The recording medium also contains means contiguous with the iron-rhodium film for applying mechanical strain above 0.3 percent to the film to increase the percentage of the film undergoing transformation to the antiferromagnetic state.

Figure 2:
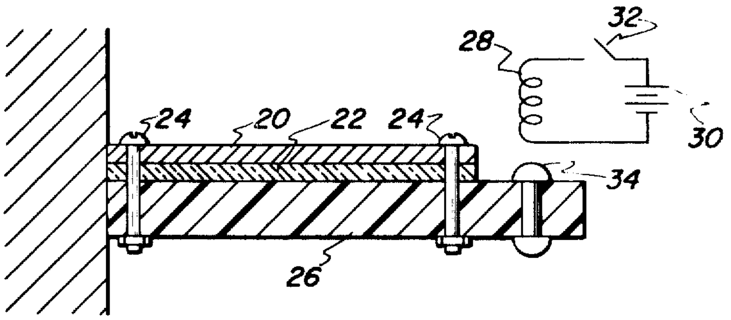
Figure 4:
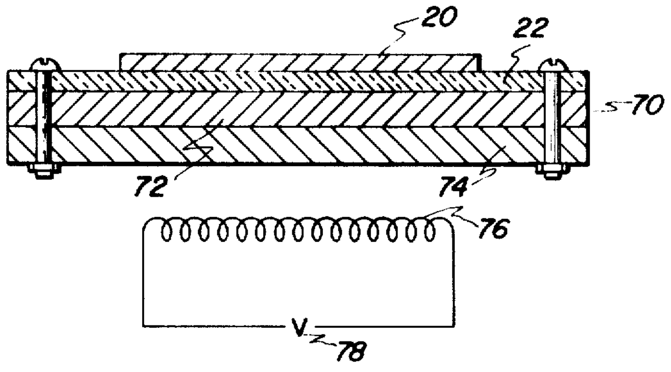
Figure 3:
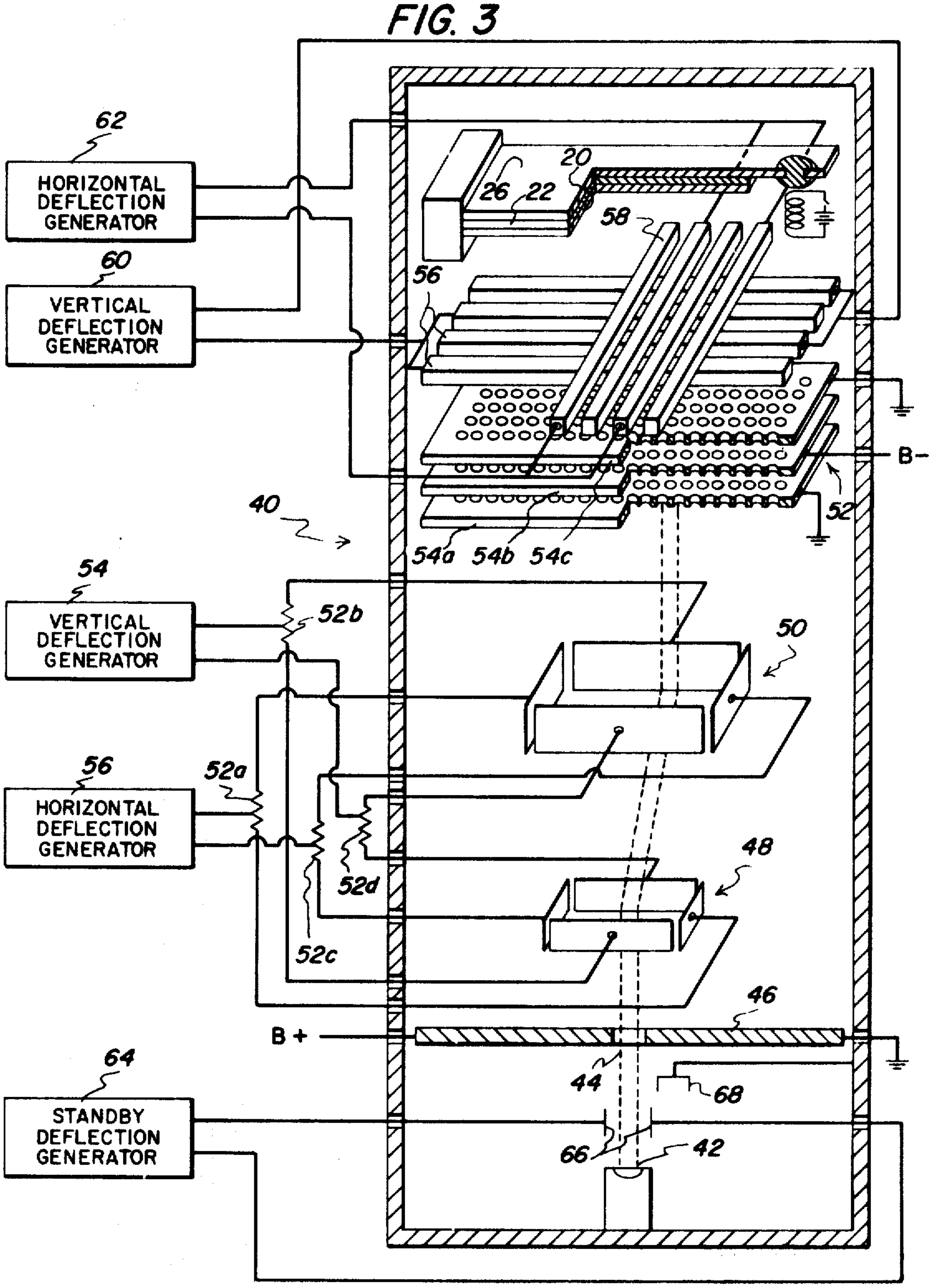

The novel features believed characteristic of the invention are set forth in the appended claims. The invention itself together with further objects and advantages thereof may best be understood by reference to the following descriptions taken in conjunction with the accompanying drawings in which:

FIG. 1 is a graphical illustration depicting the variation in magnetization with temperature and applied strain for an incomplete transition iron-rhodium film, FIG. 2 is a sectional view of an information storage device in accordance with this invention, FIG. 3 is an isometric sectional view of a recording system in accordance with the invention, and FIG. 4 is a sectional view of a second information storage device in accordance with the invention.

Iron-rhodium films exhibiting a broad thermal hysteresis and a thermal transition of less than 50 percent of the film preferably are formed in a conventional manner, e.g., by sequentially vacuum depositing iron and rhodium layers atop a refractory substrate and annealing the deposited layers at a temperature between 400° C. and 700° C. in a vacuum better than $10^{1}5$ torr to diffuse the layers and form the intermetallic compound. Typically the layers are electron beam evaporated in a vacuum between $5\times10^{18}$ and $5\times10^{16}$ torr with the sequence of deposition not being important although the iron layer preferably is initially deposited to inhibit oxidation of the iron during the subsequent diffusion anneal. The respective layers are deposited to a thickness producing a 50–65 percent rhodium composition film upon subsequent diffusion of the layers with high percentage rhodium content film, i.e., films having between 62–65 atom percent rhodium, advantageously being employed to produce low remanent magnetization films.

The deposition rate employed in forming the alternate iron and rhodium layers is not critical with deposition rates between 4° A./sec. and 35° A./sec. suitably being employed for deposition although higher deposition rates of at least 20° A./sec. are preferred to reduce contamination in the deposited layers. Desirably, the substrate is heated during deposition to a temperature in excess of 200° C. to reduce the stress in the rhodium layer deposited thereon and increase the adhesion of the layer to the substrate.

To withstand annealing temperatures in excess of 400° C. during the subsequent diffusion anneal, the substrate desirably is a refractory material chemically or mechanically polished to a thickness, e.g. less than 10,000 microns, permitting the substrate to withstand a deflection of 0.3 percent without fracturing (for reasons to be more fully explained hereinafter). Mica generally is preferred for the substrate material because of the high flexibility and commercial availability of sheet mica although other materials, such as fused silica, alumina, beryllia and silicon also can be employed as the substrate. To facilitate handling the substrate while providing a smooth surface having relatively few imperfections therein, the substrate desirably is polished to a dimension between 100 and 10,000 microns subsequent to the diffusion anneal of the layers atop a relatively thicker substrate with fused silica and silicon substrates preferably being chemically polished, e.g. by immersion in a buffered HF solution, while alumina and beryllia substrates customarily are mechanically polished utilizing a fine abrasive such as diamond or alumina. The substrate, however, should be as thick as possible for a given applied strain to reduce the bending radius required to apply in excess of 0.3 percent strain to the film. When other suitable techniques are utilized to form the incomplete transition iron-rhodium alloy film directly without a diffusion anneal, a nonrefractory substrate such as a polycarbonate resin or a polypropylene oxide desirably can be employed.

In general, the iron and rhodium sources employed to form the diffusion layers should be of high purity to inhibit the presence of certain materials such as molybdenum, nickel, copper and niobium capable of destroying the magnetic transition when present in quantities in excess of 2 percent. Other materials, e.g. less than 10 atom percent ruthenium, osminum, iridium or platinum beneficially can be employed in the iron-rhodium film to increase the critical transition temperature of the film while palladium, vanadium, manganese and gold in quantities below 10 percent atom desirably can be employed to decrease the film critical transition temperature. When it is desired to incorporate one or more of the critical transition temperature altering metals into the film, the metal can be codeposited with either the iron or rhodium layers as an alloy or deposited as a separate alternate layer in a thickness producing the desired percentage of metal in the iron-rhodium film. The total thickness of the deposited layers, however, should produce a film less than 1 mil in thickness with typical iron-rhodium films suitable for this invention having a thickness between 200 A. and 2,000 A.

After the deposition of the iron and rhodium layers upon the substrate, the structure is annealed at a temperature between 400° and 700° in a vacuum below $10^{15}$ torr to completely diffuse the layers thereby forming the intermetallic compound iron-rhodium. The diffusion anneal preferably is conducted in a very good vacuum, e.g. between $10^{16}$ and $10^{17}$ torr, to inhibit oxidation of the film with the period of the diffusion anneal generally not being critical when conducted at pressures less than $1\times10^{16}$ torr. For example, complete diffusion of the layers and a broadly hysteretic transition in the magnetic properties of the alloy film can be obtained by annealing an iron-rhodium laminar structure in a vacuum of $4\times10^{17}$ at a temperature of 700° C. for periods varying between 1 hour and 25 hours. Similarly, annealing at 400° for periods as short as 1 hour has been found to produce films exhibiting a magnetic hysteresis upon subsequent thermal cycling and a crystal structure in the film identical to the structure of bulk samples of the intermetallic compound iron-rhodium.

Incomplete transition films of the intermediate compound iron-rhodium characteristically exhibit a thermal hysteresis typically illustrated by hysteresis loop 10 of FIG. 1, e.g., a thermal hysteresis in excess of 100° C. at the mean magnetization of the film and minimum magnetization greater than 50 percent of the maximum magnetization of the film. Because the fraction of film undergoing transition between the ferromagnetic state and antiferromagnetic state can be determined approximately from the formula:

$$F=(M_1-M_2)/M_1$$

wherein

- $F$ is the fraction of the film undergoing transition,
- $M_1$ is the maximum magnetization of the film upon cooling after heating the film above the transition temperature of the film, and
- $M_2$ is the minimum magnetization of the film upon heating after cooling or straining the film below the film transition temperature, less than 50 percent of a conventionally formed iron-rhodium film generally undergoes transition to the antiferromagnetic state upon temperature cycling (unless given a second anneal in accordance with the principles disclosed in my heretofore mentioned patent application). In general, the film should exhibit as low an absolute magnetization (determined primarily by the percentage of rhodium in the film) as is consistent with the mechanism of readout for high density information storage while having as large a change in magnetization as possible between the recorded and nonrecorded states.

The percentage of iron-rhodium film undergoing transition to the antiferromagnetic state, however, can be dramatically increased to substantially in excess of 50 percent by the application of a mechanical strain to the film. The strain can be applied by frictional rubbing of the film surface, e.g. by rubbing the film surface with a cotton swab, positioning the film in a conventional ultrasonic cleaner, etc., or by the application of a mechanical bending moment to the film and the percentage of film undergoing transition to the antiferromagnetic state is increased by an amount determined primarily by the degree of applied strain. As can be seen from FIG. 1 illustrating the reduced magnetization obtainable by hand rubbing with a cotton swab for approximately 20 traversals and ultrasonically cleaning an iron-rhodium film containing 52 atom percent rhodium, the magnetization of the film decreases from a value in excess of 140 emu/g. along line 12 to a level below 30 emu/g. (a level significantly below the minimum magnetization of approximately 110 emu/g. obtainable by thermally cycling the film. In general, the application of strain to the film should increase the percentage of film undergoing transition by at least 40 percent to provide readily distinguishable signals between antiferromagnetic and ferromagnetic sites during readout after First Order Transition Recording.

It is postulated that the dramatic decrease in magnetization obtained by application of compressive mechanical strain to the film results from a forcing together of the crystalline lattice of the film to switch the magnetic exchange interaction from ferromagnetic to antiferromagnetic. The iron-rhodium film remains in the compressed lattice (or antiferromagnetic) state until the film is subsequently heated above the transition temperature, e.g., 55° C. for the film of FIG. 1, to return the film to the ferromagnetic state in a first order transition. Subsequent cooling of the film to temperatures below 150° C. does not cause a spontaneous return of the entire film to the antiferromagnetic state although the structure does produce nucleating sites for the ferromagnetic to antiferromagnetic transition thereby changing the shape of the magnetization-temperature curve and increasing slightly the percentage of the film undergoing transition to the antiferromagnetic state (as illustrated by hysteresis loop 16 of FIG. 1). Transmission electron defraction examination of the iron-rhodium film after stressing the film to the antiferromagnetic state indicates the film possesses an ordered b.c.c. structure negating a crystallographic change of the film to a disordered f.c.c. structure as basis for the loss in magnetization of the film.

Although conversion of the iron-rhodium film from the ferromagnetic to the antiferromagnetic state can be accomplished by frictional rubbing of the film, for information recording purposes the strain preferably is applied by the application of a bending moment to the film through the substrate. This can be accomplished by the structure of FIG. 2 wherein an iron-rhodium film 20 exhibiting a transition of less than 50 percent of the film to the antiferromagnetic state upon temperature cycling is disposed atop a substrate 22, e.g. of mica, mechanically fastened by bolts 24 or a suitable glue to a resilient base 26 characterized by the ability to accept a large flecture without fracturing or permanent deformation. Suitably base 26 may be a metal, such as steel, nickel or copper, or a plastic material such as polypropylene oxide, with the only criteria for base 26 being the ability of the material to withstand a flecture of at least 0.3 percent, and preferably 1 percent. One end of base 26 is fixedly secured in cantilever fashion while a magnetic coil 28 energized by electrical source 30 through switch 32 is positioned in an overlying attitude relative to the unsecured end of the base to flex the base by the application of electromagnetic force to the unsecured end of the base upon energization of coil 28. When base 26 is of a nonmagnetic material, e.g. a plastic, a magnetic insert illustrated in FIG. 2 as rivet 34 serves in association with coil 28 to apply the compressive strain to iron-rhodium film 20.

To begin recording information on iron-rhodium film 20, coil 28 is energized to apply a mechanical compressive strain of approximately 1 percent to base 26 to destroy previously written information and the compressive strain is transmitted to the overlying iron-rhodium film through bolts 24 to transform the film from a substantially ferromagnetic state to a substantially antiferromagnetic state, i.e. from point A on curve 10 to point B. Information then is recorded at selective sites along the iron-rhodium film by selectively heating sites of the film above the film transition temperature of approximately 55° C. to transform the heated sites from the antiferromagnetic state to the ferromagnetic state in a first order transitions along curve 18. Although the selective heating of the sites can be accomplished by any high intensity source of addressable electromagnetic radiation such as a selectively addressable laser beam, the high intensity electron beam device 40 illustrated in FIG. 3 is preferred for the selective heating of sites along iron-rhodium film 20 because of the superior ability of an electron beam to be finely positioned for high density recording purposes.

Electron beam device 40 generally comprises a source of 42 for the generation of an electron beam 44 which beam is passed axially through focusing lens 46 converging the electron beam impinging upon iron-rhodium film 20 to a diameter less than approximately 10 microns. After passing through focusing lens 46, the beam is electrostatically deflected by deflection units 48 and 50 to an individual lenslet of electrostatic matrix unit 52 with a perpendicular disposition of the deflection electron beam relative to the matrix lenslet being assured by the interconnection of opposite plates of deflection units 48 and 50 through potentiometer resistances 52A–52D. The potentiometer resistances are energized by output signals from vertical and horizontal deflection generators 54 and 56 suitably producing controllable voltage output signals of, for example, from 0–300 volts in 1-volt increments, to position the beam along anyone of the 300 ×300 array of lenslets in electrostatic matrix unit 52.

Electrostatic matrix unit 52 generally comprises thin superimposed metallic plates 54A–54C each having a rectangular array of apertures registered along an axis parallel to the beam to permit a passage of electrons therethrough having a velocity in an orthogonal direction relative to overlying iron-rhodium film 20. Overlying the apertured plates are electrostatic deflection units 56 and 58 each comprising a plurality of parallel conductors with the conductors of the deflection units being disposed orthogonal to each other to permit vertical and horizontal deflection, respectively, of the beam passing through any one lenslet. Vertical and horizontal generators 60 and 62 producing control lable output signals of, for example, from 0 to 300 volts, are connected to deflection units 56 and 58, respectively, to deflect the electron beam passing through each lenslet to anyone of a 300 ×300 array of bit sites along the portion of the iron-rhodium film registered with the lenslet. When recording of information on iron-rhodium film 20 is to be supervised by a perforated tape, the addressable electron beam system described in copending U.S. Pat. application Ser. No. 671,353, filed in the name of Sterling P. Newberry on Sept. 28, 1967 and now U.S. Pat. No. 3,491,236 and assigned to the assignee of the present invention, suitably may be employed.

To irradiate a selective bit site for recording information thereon, electron beam source 42 is activated to produce an electron stream therefrom and a suitable voltage from vertical and horizontal deflection generators 54 and 56 is applied to deflection units 48 and 50 to direct beam to an individual lenslet of electrostatic matrix unit 52 registered with the iron-rhodium bit site to be irradiated. Preselected potentials also are applied to fine deflection units 56 and 58 of the electrostatic matrix unit from deflection generators 60 and 62, respectively, to position the electron beam passing through the selected lenslet at a predetermined site along iron-rhodium film 20. Irradiation of the film is continued until the temperature of the film site is raised above the film transition temperature whereupon the site is transformed to the ferromagnetic state in a first order transition. The electron beam is then deflected by standby deflection generator 64 and deflection plates 66 to Faraday cage 68 permitting a variation in the applied voltages to the deflection units of electron beam device 40 for recordation upon a differing site of the iron-rhodium film without erasing previously recorded information. In general, an 8-kv., 2 $\times 10^{17}$ ampere electron beam irradiation of a 10-micron region of an iron-rhodium film for 4 milliseconds has been found adequate to convert the irradiated bit site from the antiferromagnetic to the ferromagnetic state. Adjacent bit sites are not raised above the critical transition temperature and remain essentially antiferromagnetic.

The iron-rhodium film having bit sites of a first magnetization, e.g. sites thermally transformed to a magnetization approximately 130 emu/g. at point C of hysteresis loop 16, and sites of a second magnetization e.g. substantially antiferromagnetic sites having a magnetization of approximately 25 emu/g. at point B, then is positioned within a short duration, high intensity magnetic field, e.g. a pulsed field greater than 300 oersteds, to align the ferromagnetic bit sites within the film whereafter the recorded information is read out utilizing any conventional readout technique such as the electron mirror microscopy techniques described in an article by L. Mayer, entitled "Electron Mirror Microscopy of Magnetic Domains," Journal of Applied Physics, Vol. 28, No. 9, Sept. 1957, or the electron microscope readout techniques described in an article by R. F. M. Thornley et al. entitled "-Measure Magnetic Fields With A Scanning Electron Microscope," Research and Development Magazine, Page 20–24, published Aug., 1969.

FIG. 4 illustrates a second preferred embodiment of the recording medium of this invention wherein the incomplete transition iron-rhodium film 20 and underlying substrate 22, e.g. a fused silica substrate polished to a dimension less than 1 mil, are bolted at each end to a commercially available bimetal strip 70 composed of juxtaposed iron and copper layers 72 and 74, respectively. To record information upon the iron rhodium film, current is passed through heater coil 76 underlying the bimetal strip to radiantly heat the strip thereby producing a bending moment therein which is transmitted to iron-rhodium film through the fused silica substrate. The bending moment applied to the iron-rhodium film converts in excess of 50 percent of the film to the antiferromagnetic state whereupon current flow through the bimetal strip is terminated. Selective sites along the film then are irradiated, e.g. with a controllable electron beam, to raise the site temperature above the critical transition temperature thereby converting the site to the ferromagnetic state in a first order transition and the site remains substantially ferromagnetic (although some decrease or increase in magnetization may occur upon cooling to room temperature) permitting digital information to be recorded by the degree of magnetization of various sites in the film. Readout then can be achieved by conventional electron mirror microscopy techniques without altering the magnetization profile along the iron-rhodium film. To erase the recorded information, heater coil 76 again is energized by source 78 to apply a compressive strain to the overlying iron-rhodium film thereby reconverting the entire film surface to the antiferromagnetic state.

Although the recording medium employed for First Order Transition Recording has been described specifically herein by utilizing a bimetal strip or an electromagnetic coil to apply flecture to the substrate upon which the incomplete thermal transition iron-rhodium film is deposited, any magnetostrictive or electrostrictive material, e.g. bulk iron-rhodium or barium titanate, capable of generating strain in excess of 0.3 percent upon suitable energization can be employed to apply compressive mechanical strain to the film for transformation of the film to the antiferromagnetic state without departing from the scope of this invention.

What is claimed is:

1. A method of recording information in digital form by the transformation between an antiferromagnetic state and a ferromagnetic state of selective sites of a homogeneous iron-rhodium film having a composition range between 50 and 65 atom percent rhodium and exhibiting a magnetic transition of less than 50 percent of the film when cycled through the thermal hysteresis loop of the film comprising applying strain in excess of 0.3 percent to said iron-rhodium film to increase the percentage of film undergoing transition between the ferromagnetic and antiferromagnetic states, heating selective sites in said film above the film transition temperature to return said heated sites to the ferromagnetic state in a first order transition and detecting the magnetization of sites in the film.

2. A method of recording information in digital form according to claim 1 wherein the percentage of film undergoing transition from the ferromagnetic state to the antiferromagnetic state is increased by at least 40 percent relative to the original thermal transition.

3. A method of recording information in digital form according to claim 1 wherein said strain is produced by frictional agitation of the film surface.

4. A method of recording information in digital form according to claim 1 wherein said strain is produced by mechanical deflection of the substrate to which the film is secured.

5. A method of recording information in digital form according to claim 1 wherein said film is formed by sequentially depositing iron and rhodium films atop a refractory substrate and subsequently annealing the laminar structure to diffuse the layers.

6. A recording medium comprising a resilient nonmetallic substrate capable of withstanding a strain in excess of 0.3 percent, an iron-rhodium film situated atop said substrate, said iron-rhodium film having a composition range between 50 and 65 percent rhodium and exhibiting a magnetic transition of less than 50 percent of the film when cycled through the thermal hysteresis loop of the film and means contiguous with said film for applying strain to said film for increasing the percentage of film undergoing transition to the antiferromagnetic state.

7. A recording medium according to claim 6 wherein the percentage of film undergoing transition to the antiferromagnetic state is increased by at least 40 percent relative to the percent of film undergoing thermal transition to the antiferromagnetic state.

8. A recording medium according to claim 7 wherein said substrate is selected from the group consisting of mica, alumina, beryllia, silicon and fused silica having a thickness between 100 and 10,000 microns.

9. A recording medium according to claim 7 wherein said means for applying strain to said film comprise of a bimetal strip mechanically secured to said substrate.

10. A recording medium according to claim 7 wherein said substrate is fixedly secured to an electromechanical transducer to permit application of strain to said iron-rhodium film.

11. A recording medium according to claim 7 wherein said means for applying strain to said film comprise an electrostrictive base fixedly secured to said substrate.